April 3, 1956 N. D. COTE 2,740,364
APPARATUS FOR PELLETING MILL FEEDS
Filed Aug. 23, 1954 2 Sheets-Sheet 1

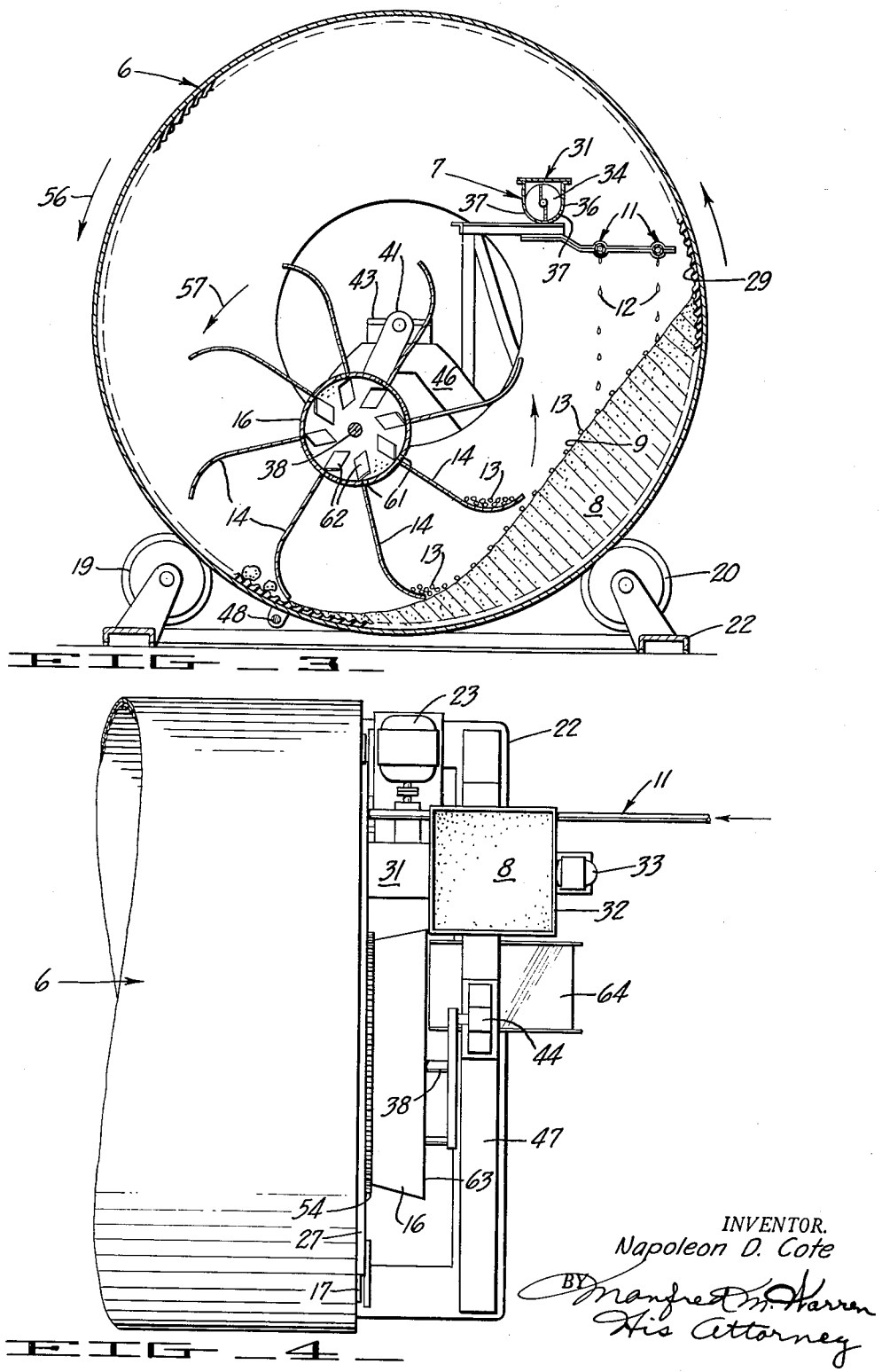

2,740,364

APPARATUS FOR PELLETING MILL FEEDS

Napoleon D. Cote, Oakland, Calif.

Application August 23, 1954, Serial No. 451,610

4 Claims. (Cl. 107—8)

The invention relates to the preparation of animal feeds and more particularly to the conversion of finely ground grains, cereals, meals and the like into larger granular or particulate form.

As will be understood a wide variety of pulverulent animal feeds consisting of various formulas of cereals such as wheat, oats, rye, corn, barley, cotton seeds, soya beans and the like as well as finely chopped hay and alfalfa, meat and fish meals, powdered milk and other ingredients are available for feeding pets, poultry, stock, rabbits and other animals. The pulverulent animal feeds herein generally referred to as mill feeds have several well known disadvantages in their finely milled form. They are easily and frequently blown and scattered about by winds or other air currents, lost when deposited on the ground due to careless feeding or activity of the animals, and are subject to premature moulding and spoilage. To avoid these disadvantages mill feeds are frequently pelleted. In such form the feed is easier to handle and will stay in troughs and other feeding equipment, is not lost if scattered onto the ground, but can be picked up and eaten by the animals and may be conveniently sterilized and kept free of deterioration a much longer period of time.

It is accordingly an object of the present invention to provide an apparatus by means of which mill feeds of the character described may be quickly, easily and economically converted into pellet form.

Another object of the present invention is to provide an apparatus of the character described which may be used with a wide variety of ingredients and formulations.

A further object of the present invention is to provide an apparatus of the character above which will most effectively and efficiently accomplish the conversion of mill feeds to pellet form, with minimum wear on the moving operating parts of the equipment and with minimum power requirements.

Referring to said drawings:

Figure 3 is a vertical cross-sectional view of the apparatus taken substantially on the plane of line 3—3 of Figure 1.

Figure 4 is a fragmentary plan view of the apparatus.

Figure 1:
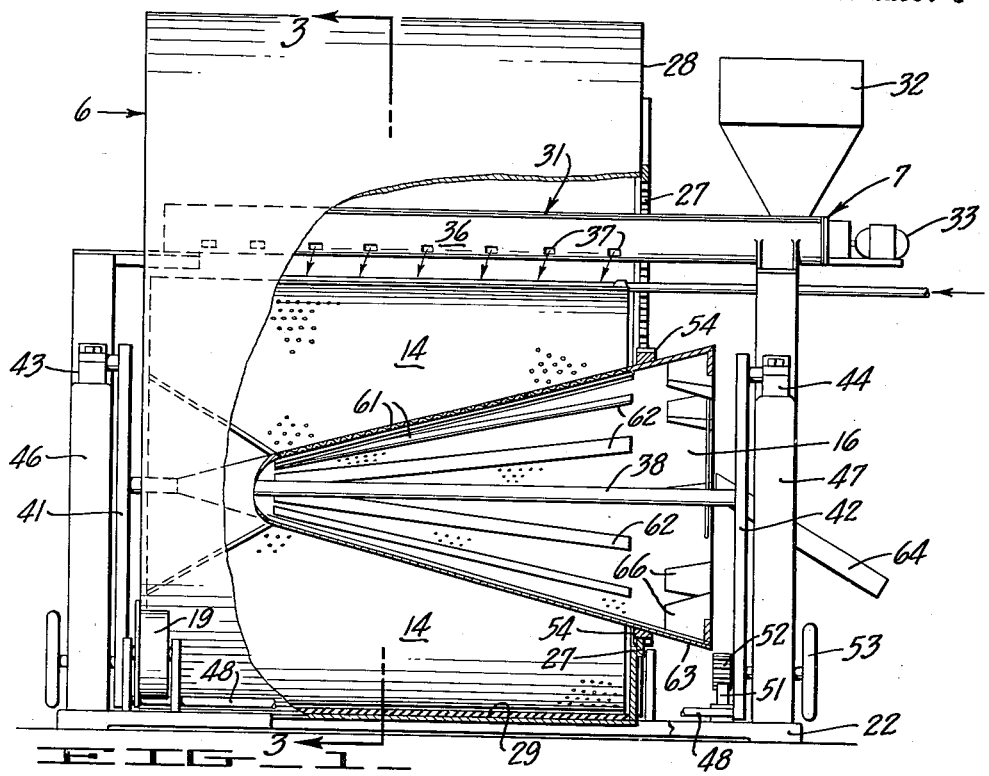
Figure 1 is a side elevation of an apparatus for pelleting mill feeds constructed in accordance with the present invention, portions of the apparatus being broken away and shown in section.

The apparatus of the present invention consists briefly in the provision of a container 6, here in the form of a horizontally disposed rotating drum, into which is deposited, as by means of a conveyor 7, mill feed 8 to be pelleted, the action of the drum being to support and carry up against a side of the drum a quantity of mill feed with the outer surface 9 of the feed arranged in an inclined plane. Means 11 is provided within the container for releasing drops 12 of water onto the surface 9 adjacent the upper end thereof, so as to produce doughy balls 13 on and adjacent to the surface 9. The latter tend to roll and otherwise gravitate toward the lower end of the surface 9, where they are picked up by perforated rotating vanes means 14 moving through the surface 9 of the feed 8 and thus screened and segregated from the balance of the feed. The vanes 14 also function to impart a rolling action to the balls which is continued in the movement of the balls over a discharge cone 16 for the apparatus, the rolling action functioning to effect a compaction of the balls.

The drum 6 is here conveniently supported for rotation about its axis, disposed in a horizontal position, by resting the outer periphery of the drum upon a plurality of rollers 17, 18, 19 and 20 which are supported and journaled for rotation by a base frame 22. Rotation of the drum is here effected by an electric motor 23 supported on a frame bracket 24 and having a geared connection 26 to an internal ring gear 27 carried on an end flange 28 of the drum. Preferably the inside surface of the drum is rough or corrugated so as to improve its lifting action on the mill feed 8 deposited in the drum; and as here shown as a nice feature of the present apparatus, the interior surface of the drum is provided with a corrugated rubber lining 29. The latter with its ribbed or corrugated surface provides a desired lifting action on the mill feed and well stands the wear and abrasion of the tumbling of the mill feed thereover throughout a long and useful life.

Any convenient means may be used for conveying the mill feed into the drum. As here shown a more or less standard type screw conveyor 31 is used, having a receiving hopper 32 at one end outside of the drum, and being mounted to extend generally longitudinally through the drum near the upper extremity thereof and to one side of its central axis, for the deposit of mill feed into the drum under the conveyor as illustrated in Figure 3. An electric motor 33 is here connected to the rotary vane drive 34 of the conveyor for moving the feed from the hopper 32 longitudinally through the conveyor tube 36. The latter is provided with a plurality of longitudinally spaced openings 37 for discharging the mill feed into the drum in a uniform manner.

The water distributing means 11 here consists of one or more longitudinally arranged tubes positioned within the drum over the upper portion of the inclined surface 9 of mill feed materials. The tubes 11 are suitably connected to a source of water under pressure and are provided with a plurality of longitudinally spaced openings for issuing the water droplets 12 in a uniformly distributed pattern throughout the length of the drum. If desired, soluble mineral matter may be introduced into the water where desired in the end formulation of the feed.

Figure 2:
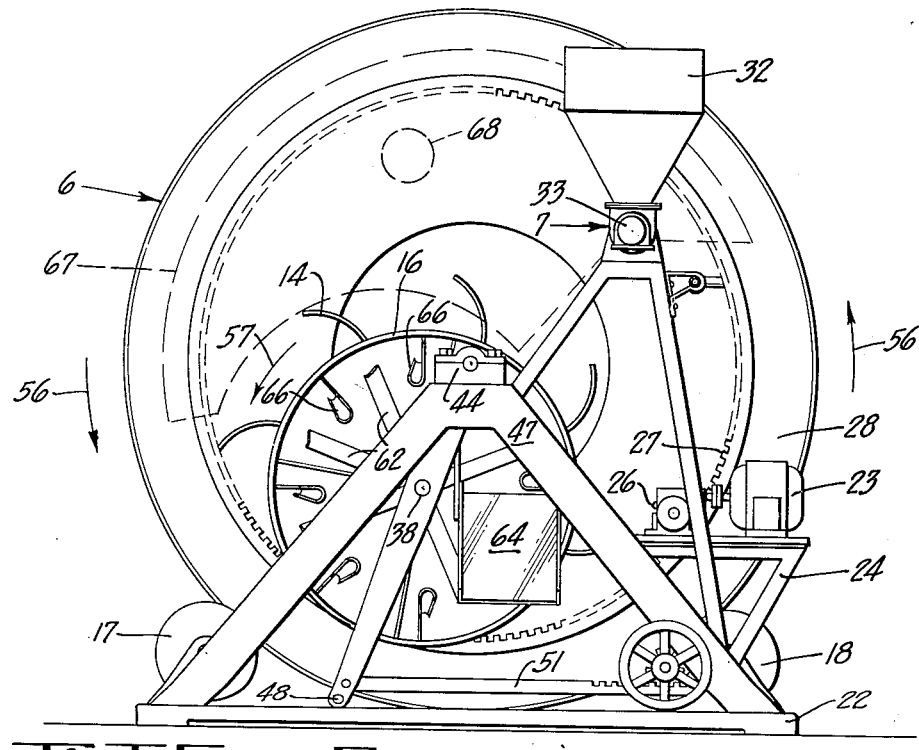
Figure 2 is an end elevation of the apparatus illustrated in Figure 1.

Discharge of the balls from the apparatus is effected as above noted by a hollow cone 16 which is mounted for rotation in the drum with its axis parallel to but spaced from the drum axis so as to support the vanes 14 for movement through the mill feed 8 adjacent to the lower end of the inclined surface 9. As here shown, the cone 16 is provided with an axially extending shaft 38 which is journaled at its opposite ends outside of the drum 6 in arms 41 and 42, which are in turn pivoted at their upper ends in bearings 43 and 44 carried at the upper ends of standards 46 and 47 supported on the base frame 22, the lower ends of the arms 41 and 42 being connected by a link 48 for joint swinging action. Preferably as here shown the bearings 43 and 44 are positioned to pivot the arms 41 and 42 coaxially with the drum 6. The positioning of the opposite ends of the cone shaft 38 at a lower position on the arms spaces the position of the cone axis in spaced parallel relation to the axis of the drum, and the pivoting of the arms permits a swinging of the cone and the attached vanes 14 to and from the inclined surface 9 of the mill feed. Means for adjusting the position of the cone includes a rack 51 connected at one end to arm 42 and engaged with a pinion 52 carried by the base frame and rotated by a hand wheel 53. As will be seen in Figure 2, rotation of the wheel 53 in a counterclockwise direction will advance the cone in the direction of the mill feed surface 9, and a contrariwise rotation of the hand wheel in a clockwise direction will effect a retracting of the cone with respect to the surface 9. Rotation of the cone in its various arcuately adjusted positions is effected by means of a ring gear 54, see Figure 4, secured on the outside periphery of the cone and engaged with the inside ring gear 27 on the drum. As will be observed from Figures 2 and 3, rotation of the drum 6 in a counterclockwise direction as indicated by arrow 56 will cause a counterclockwise rotation of the drum as indicated by arrow 57 but at a greater speed.

In accordance with the present construction, the vanes 14 are mounted on the outside of the cone 16 and extend generally radially therefrom so as to move into and through the mill feed 8 adjacent the lower end of the surface 9. Preferably these vanes are curved forwardly in their direction of rotation, so as to act as scoops in picking up and screening through their perforations the mill feed thus removing the doughy balls 13 from the surface 9. As the vanes 14 rotate upwardly the balls 13 thereon will roll across the vanes and to the cone, and as here shown the latter is formed with a passageway 61 at the base end of each of the vanes so as to receive the balls from the vanes for movement of the balls into the interior of the cone. Preferably the passageways 61 are screened to reject the passage of over-size balls or clumps of materials and these are dropped off of the outside of the cone and onto the bottom of the drum where they are broken up by the milling action of the ends of the vanes thereon, and the cone at the inside of the passageways is provided with baffles 62 for preventing the balls entering the interior of the cone from returning back through the passageways to the drum. Also preferably the cone wall is perforated to effect a screening of fine material and redeposit thereof back into the drum during the rolling discharge of the balls over the interior surface of the cone.

As will be understood the horizontal positioning of the axis of the cone provides a downwardly inclined internal conical surface extending to the larger end 63 of the cone thus providing a longitudinal rolling discharge of the balls to such end. Preferably the cone end 63 is extended to the outside of the drum 6 for convenient removal of the balls. For this purpose an inclined discharge chute 64 is provided at the end of the apparatus at the larger end of the cone and a plurality of vanes 66 are mounted at the larger end of the cone for elevating the balls to the upper end of the chute 64 and discharging the balls thereon.

If desired, warm air may be circulated through the drum during its operation so as to assist in the drying of doughy balls which are formed in the operation, and to keep the apparatus warm and to prevent sweating or forming of condensation, and to prevent possible sticking of the material. For this purpose a baffle 67 may be provided across the open end or ends of the drum so as to assist in confining therein heated air which may be introduced to the interior of the drum through an opening 68 in the baffle. Also, if desired, the water may be heated.

The mixture of mill feeds should be selected so that at least 50 per cent is finely milled or powdered. The apparatus and process will work well with mill feeds that are all powdered. Where coarser or larger grains are present there is a second method operable to form the balls. In such case the water droplets wet the coarse feed particles which are then tumbled and rolled in the fine powdered feed to effect a flour like coating over and around the particles and thus provide enlarged balls. These are picked up, screened and rolled by the action of the vanes and cone in the same manner as the doughy balls formed by the water droplets mixing with the finely milled feed or powder.

From the foregoing the operation of the apparatus and the practicing methods of the present invention will be clear. The apparatus and methods are designed for mill feeds in powdered form or with a coarse grain consistency up to about 50%. The fine milled feed should be near powder form and the coarse grain may extend to about rice-size particles. The addition of the water or wetting solution is controlled so that the majority of the mass rolling in the mill will be in a dry powdered form. The doughy balls formed by the droplets will descend down the inclined surface 9 and will be carried downwardly in the tumbling mass of feed to the lower portion of the feed. The rotating vanes 14 are set to scoop up the lower end of the tumbling mass in the mill and the doughy balls are thus picked up and screened from the balance of the feed and rolled across the vanes and into and longitudinally through the discharge cone, so as to effect a desired compaction of the balls. Upon leaving the discharge chute 64 the balls may be further rolled if desired and are dried and baked. Preferably the dehydrating of the balls is effected in vacuum or subatmospheric drying ovens and baking may be continued to the point of toasting if desired. Various types of drying and baking equipment are available for this purpose including tube or drum types dryers which will provide a rolling motion of the balls during drying. By the use of drying temperatures of 160 to 180 degrees Fahrenheit, all moulds and fungi will be destroyed or rendered inactive and will remain so because of the dry state of the product. The various apertures and screens herein above described for segregating the material in the apparatus may be selected to obtain balls or pellets in a range of approximately a fourth to an eighth of an inch.

I claim:

1. An apparatus for pelleting mill feeds comprising, a cylindrical drum, means for depositing mill feeds to be pelleted into said drum, means supporting said drum with its axis substantially horizontal and rotating said drum about said axis so as to support said feeds in said drum with a surface of said feeds arranged in an inclined plane, means in said drum for releasing drops of water onto said inclined surface to produce doughy balls, a hollow cone mounted for rotation in said drum with the axis of said cone parallel to but spaced from said drum axis, means for rotating said cone at a faster speed than said drum, and a plurality of perforated vanes carried by and extending radially from said cone for rotation therewith and for movement through said surface for removal and screening of said balls therefrom, said cone being formed with passageways receiving said balls from said vanes into the interior of said cone for effecting a rolling discharge of said balls from the larger end of said cone.

2. An apparatus for pelleting mill feeds comprising, a cylindrical drum, means for depositing mill feeds to be pelleted into said drum, means supporting said drum with its axis substantially horizontal and rotating said drum about said axis so as to support said feeds in said drum with a surface of said feeds arranged in an inclined plane, means in said drum for releasing drops of water onto said inclined surface to produce doughy balls, a hollow cone mounted for rotation in said drum with the axis of said cone parallel to but spaced from said drum axis, means for rotating said cone at a faster speed than said drum, and a plurality of perforated vanes carried by and extending radially from said cone for rotation therewith and for movement through said surface for removal and screening of said balls therefrom, said cone being formed with passageways receiving said balls from said vanes into the interior of said cone for effecting a rolling discharge of said balls over the interior wall of said cone and from the larger end thereof, said cone wall being perforated to effect a screening of fine feeds and deposit thereof back in said drum during said rolling discharge of said balls.

3. An apparatus for pelleting mill feeds comprising, a cylindrical drum mounted with its axis substantially horizontal and for rotation about said axis, means for depositing mill feeds to be pelleted into said drum, means rotating said drum so as to support said feeds with a surface thereof arranged in an inclined plane, means in said drum for releasing drops of water onto said surface to produce doughy balls, a hollow cone mounted for rotation in said drum with the axis of said cone parallel to but spaced from said drum axis and arranged with the larger end of said cone extending from an end of said drum, means for rotating said cone at a faster speed than said drum, a plurality of perforated vanes carried by and extending radially from said cone for rotation therewith and for movement through said surface for removal and screening of said balls therefrom, said cone being formed with passageways receiving said balls from said vanes into the interior of said cone for effecting a rolling discharge of said balls over the interior wall of said cone and from the larger end thereof, said cone wall being perforated to effect a screening of fine feeds and deposit thereof back into said drum during said rolling discharge of said balls, a discharge chute mounted at the larger end of said cone, and vanes carried by said larger cone end and elevating said balls to said chute and effecting a discharge therein.

4. An apparatus for pelleting mill feeds comprising, a cylindrical drum mounted with its axis substantially horizontal and for rotation about said axis, means for depositing mill feeds to be pelleted into said drum, means rotating said drum so as to support said feeds with a surface thereof arranged in an inclined plane, means in said drum for releasing drops of water onto said surface to produce doughy balls, a hollow cone mounted for rotation in said drum with the axis of said cone parallel to but spaced from said drum axis, means for rotating said cone at a faster speed than said drum, a plurality of perforated vanes carried by and extending radially from said cone for rotation therewith and for movement through said surface for removal and screening of said balls therefrom, said cone being formed with passageways receiving said balls from said vanes into the interior of said cone for effecting a rolling discharge of said balls over the interior wall of said cone and from the larger end thereof, and manually operable means for adjusting the relative positioning of said drum and cone axes so as to control the extent of movement of said vanes through said feeds.

References Cited in the file of this patent

UNITED STATES PATENTS

| | | |
|---|---|---|
| 312,041 | Upjohn | Feb. 10, 1885 |
| 1,656,572 | Schultze | Jan. 17, 1928 |
| 1,877,266 | Chapin et al. | Sept. 13, 1932 |
| 1,980,130 | Fasting | Nov. 6, 1934 |
| 2,158,513 | Lloyd | May 16, 1939 |
| 2,293,439 | Lloyd | Aug. 18, 1942 |